United States Patent [19]

Hodgkinson et al.

[11] Patent Number: 5,031,236
[45] Date of Patent: Jul. 9, 1991

[54] POLARISATION INSENSITIVE OPTICAL SIGNAL RECEPTION

[75] Inventors: Terence G. Hodgkinson; David W. Smith, both of Woodbridge, England

[73] Assignee: British Telecommunications public limited company, United Kingdom

[21] Appl. No.: 530,421

[22] Filed: May 31, 1990

Related U.S. Application Data

[63] Continuation of Ser. No. 136,128, Dec. 21, 1987, abandoned.

[30] Foreign Application Priority Data

Dec. 29, 1986 [GB] United Kingdom ................. 8630959

[51] Int. Cl.$^5$ ............................................ H04B 10/06
[52] U.S. Cl. .................................... 455/619; 455/616
[58] Field of Search ................... 370/2; 455/600, 612, 455/606-608, 616-619; 380/54

[56] References Cited

U.S. PATENT DOCUMENTS

| | | | |
|---|---|---|---|
| 3,936,748 | 2/1976 | Bomke | 455/616 |
| 4,704,741 | 11/1987 | Shikada | 455/612 |
| 4,723,310 | 2/1988 | DeCorlieu et al. | 455/608 |
| 4,752,120 | 6/1988 | Shimizu | 455/616 |

FOREIGN PATENT DOCUMENTS

| | | | |
|---|---|---|---|
| 0232043 | 8/1987 | European Pat. Off. | 455/612 |
| WO86/07513 | 12/1986 | PCT Int'l Appl. | 453/612 |
| 2153176 | 8/1985 | United Kingdom | 455/612 |

OTHER PUBLICATIONS

"Demodulation of Optical DPSK Using in Phase Modulation and Quadrature Detection", Hodgkinson et al., Electronic Letters vol. 21, #19, 9-12-85, pp. 867-868.
"Polarization-Diversity Receiver for Heterodyne/Coherent Optical Fiber Communications" by Takanori Okoshi, et al. University of Tokyo; 30C3-2-pp. 386-387.
Electronics Letters; 29th Aug. 1985, vol. 21, No. 18, "New Polarisation-Control Scheme for Optical Heterodyne Receiver Using Two Faraday Rotators"-78-7-788.
"Time-Division Optical Power Divider Using Electro-Optic Light Switches"; Journal of Lightwave Technology, vol. LT-4, #2, Feb. 1986, pp. 169-175.
"Novel LiNbO3 Integrated-Optic Component for Coherent Optical Heterodyne Detection"; Electronics Letters, vol. 21, #23, Nov. 7, 1985, pp. 1077-1079.
"Integrated Optic Devices for Coherent Transmission"; Journal of Lightwave Technology, vol. LT-4, #7, Jul. 1986, pp. 852-857.
"Wavelength-Independent, Optical-Damage-Immune LiNbO3 TE-TM Mode Converter"; Optics Letters; vol. 11, #1, Jan. 1986, pp. 39-41.
"Polarization-State Control Schemes... Optical Fiber Communications"; Journal of Lightwave Technology; vol. LT-3, #6, Dec. 1985, pp. 1232-1237.
Applied Physics Letters, vol. 47, No. 11, Dec. 1985, pp. 1137-1139, Woodbury, New York, US; R. C. Alferness et al., "Low Loss, Wavelength Tunable, Waveguide Electro-Optic Polarization Controller for Lambda=1.32mum".
Patents Abstracts of Japan, vol. 8, No. 228 (P-308)[1665], 19th Oct. 1984; & JP-A-59 107 324 (FUJITSU).

Primary Examiner—Reinhard J. Eisenzopf
Assistant Examiner—L. Van Beek
Attorney, Agent, or Firm—Nixon & Vanderhye

[57] ABSTRACT

The invention provides methods and devices for processing an optical signal. In one embodiment, an optical device (101) for scrambling an input optical signal comprises an optical switch (10) which switches the optical signal between two intermediate optical paths (13,14) under control of a scrambling signal from a control circuit (12). The polarization of the signal in one of the intermediate optical paths (13) is rotated by a TE-TM converter (15). The polarization of the two intermediate signals are thereby made mutually orthogonal. These mutually orthogonal signals are then recombined by a directional coupler (16) to provide a combined output optical signal with a scrambled polarization alternating between orthogonal states according to the frequency of the scrambling signal.

The invention may be applied to improve signal reception, for example, in coherent optical transmission systems.

30 Claims, 8 Drawing Sheets

(i) TRANSMITTED SIGNAL POLARISATIONS

(ii) LOCAL OSCILLATOR SIGNAL POLARISATION.

Fig.8

(iii) RECEIVED SIGNAL POLARISATIONS

(a)

(b)

(iv) IF CHARACTERISTICS – NO PHASE SHIFT IN SCRAMBLING.

MEAN 0.62

MEAN 0.33

(v) IF CHARACTERISTICS – WITH PHASE SHIFT IN SCRAMBLING.

MEAN 0.5

MEAN 0.5

POLARISATION INSENSITIVE OPTICAL SIGNAL RECEPTION

This is a continuation of application Ser. No. 07/136,128, filed Dec. 21, 1987, now abandoned.

BACKGROUND OF THE INVENTION

1. Field of the Invention

The present invention relates to methods of processing an optical signal, and to optical devices for performing the processing, all for use in optical transmission systems. The invention finds application in improving optical signal reception particularly, but not exclusively, in coherent optical transmission systems.

DESCRIPTION OF RELATED ART

Coherent optical fibre transmission systems using heterodyne and homodyne reception techniques offer considerable gains in receiver sensitivity over conventional direct detection systems. However, the performance of a coherent receiver depends on matching the signal polarisation at the input to the receiver to the polarisation of the local oscillator. After transmission along a birefringent optical fibre, the state of polarisation of the signal at the receiver input is generally indeterminate. The signal is detected by mixing of received and local oscillator fields on the surface of a square law optical detector. If the polarization of the received signal and the local oscillator signal are not matched there is an effective receiver performance penalty which shows up as fading in the detected signal. In the extreme case of orthogonal received and local oscillator signal polarisations, the signal is completely lost.

To reduce the problem of polarisation sensitivity a so-called polarisation diversity receiver has been proposed by Takanori Okoshi, Shiro Ryu and Kazura Kikuchi in "Polarisation diversity receiver for heterodyne coherent optical fibre communications", ICOC 1983 Paper 30C3-2, Tokyo, June 1983.

In the polarisation diversity receiver, two orthogonally polarised components of the input signal are separated and heterodyne detected individually before being summed in an output stage. The polarisation diversity receiver limits the maximum fade loss to 3 dB. However, one disadvantage is that the conventional receiver electronics must be duplicated in such a receiver. The Okoshi et al design also requires a Faraday rotator for polarisation changing. Faraday rotators are inconvenient for the high operating currents which they need and for the powerful magnetic fields which they must generate in order to influence the polarisation.

An alternative solution to the problem of coherent receiver design is provided by so-called polarisation tracking receivers which employ sophisticated feedback loops to actively control the local oscillator polarisation in order to match it to the signal polarisation (or vice-versa). Conveniently, the local oscillator polarisation is altered by using piezoelectric transducers, rotatable phase plates or similar bulk optical devices. An example polarisation tracking receiver is described in "New polarisation-control scheme for optical heterodyne receiver using two Faraday rotators", Okoshi et al, Electronics Letters, Vol. 21 No. 18, Aug. 29, 1985. One drawback of this type of receiver is the necessity for a complex and sensitive feedback control system. The disadvantages of Faraday rotators have already been mentioned above. Whilst piezoelectric transducers are frequently considered as alternatives, these too have disadvantages. For example, they are mechanical and consequently relatively slow in operation. Furthermore, the high voltages of the order of 1 kV which are needed to operate these devices are potentially hazardous to associated electronic circuits and consequently demand special protection.

Polarisation sensitive devices may also be employed in optical transmission systems which use direct detection rather than coherent techniques. For example, planar waveguide devices, which generally operate with a preferred input polarisation, may be used to switch signals at a receiver or for signal distribution at network nodes. Therefore, conventionally some form of polarisation control is also required in direct detection systems which use such components if the potential problems of extreme signal loss which can occur from misalignment of signal polarisation are to be avoided.

SUMMARY OF THE INVENTION

It is one object of the present invention to provide a method of processing an optical signal which enables the problems of polarisation mismatch which may occur at polarisation sensitive parts of a transmission system to be overcome or at least mitigated.

Another object of the present invention is to provide an optical device for use in optical transmission systems which operates according to the method and removes the need for polarisation matching at polarisation sensitive parts of a system.

It is a further object of the present invention to provide a version of the aforesaid optical device which may be used both to process an optical signal by a method according to the method of the invention and which may also be used more generally as a polarisation controller. Such a device is suitable for use in a polarisation tracking receiver, for example, and may be implemented as an integrated optical device. The device does not require, and avoids the associated disadvantages of, bulk optical components as described above.

According to the invention in a first aspect a method of processing an optical signal comprises altering the polarisation state of the optical signal in sequential time intervals under control of a control signal at a predetermined scrambling frequency to provide a processed optical signal with substantially orthogonal polarisation states alternating sequentially according to the scrambling frequency.

Using this method an optical signal with a single, substantially constant, initial polarisation state is transformed into a signal with alternating orthogonal polarisation states. This ensures that, if such a processed optical signal is input to a polarisation sensitive device with one of the alternating polarisation states wholly unmatched or badly matched to the device, the other will be wholly or at least better matched, and consequently the processed signal will be passed by the polarisation sensitive device and, more particularly, complete signal loss, which might otherwise occur with a single polarisation signal, is avoided.

Conveniently the method includes splitting the optical signal into two intermediate optical signals, altering the polarisation states of the intermediate optical signals relative to each other and recombining the intermediate optical signals to produce the processed optical signal.

The relative proportions of the optical signal which are split into the intermediate optical signals may be controlled by switching of the optical signal under control of the control signal.

The optical signal is preferably completely switched in sequential time intervals to alternately provide each of the intermediate optical signals and the polarisation states of the switched intermediate optical signals are rendered mutually orthogonal. The processed signal is then conveniently formed from a sequential recombination of the alternating, intermediate optical signals.

Alternatively, for example, the method may include rendering the polarisation states of the intermediate optical signals mutually orthogonal and phase modulating at least one of the intermediate optical signals under control of the control signal. In this case the vector sum of the polarisation states of the recombined intermediate optical signals alternates to provide the required alternating orthogonal polarisation states of the processed optical signal.

Preferably, the phase of one of the intermediate optical signals is modulated to impose step phase shifts of substantially 180° during alternate half-cycles of the control signal. In this way it is possible to implement the method using only one phase modulator.

When the method is used for altering the polarisation state of an optical signal used for information transmission the control signal is set at a frequency sufficient such that information carried on the signal can be made available at a detector using the output optical signal in one of the alternating orthogonal states independent of the other. By providing a transmitted information signal with alternating othogonal polarisation states, the possibility of total signal loss which may otherwise occur at polarisation sensitive parts of a system if polarisation states are not well matched is avoided. Alternating the polarisation, at a sufficient frequency as defined above, effectively duplicates the transmitted signal such that the information in the signal may be independently reconstructed by examination of the signal in either polarisation state alone, if necessary.

The processed signal comprising alternating polarisation states may be optically coupled to a birefringent medium such as an optical fibre for transmission to a detector. However, whilst a birefringent transmission medium may rotate a single input polarisation in an arbitrary manner, it can be shown that two orthogonally polarised inputs, although each subject to some absolute arbitrary rotation, will nevertheless remain orthogonal relative to each other when output from the birefringent medium. Thus, even if one of the orthogonal states output from the birefringent medium is completely mismatched at some polarisation sensitive part of the transmission system, the other will invariably be well matched, and consequently, the information available from the signal will not be lost.

The method according to the invention may be employed in transmission systems using coherent or direct detection techniques.

It will be appreciated that, since the polarisation of the local oscillator in a coherent receiver can never be simultaneously orthogonal to both components of the processed optical signal, scrambling of the polarisation of a transmitted signal using the method of the present invention eliminates the possibility of complete signal loss at the receiver which can occur in a conventional coherent transmission system.

In a coherent optical system, as an alternative to scrambling the polarisation of the transmitted information signal directly, an equivalent result may be achieved by scrambling the local oscillator signal by the method of the invention. In this case, the control signal is set at a frequency sufficient such that the information on the information signal is independently detectable if the polarisation of one of the alternating orthogonal states of the processed local oscillator signal alone matches the polarisation state of the information signal arriving at the receiver.

This alternative may be especially suitable, for example, where several distributed transmitters are transmitting to one central receiver, as one polarisation scrambler will then suffice to ensure detection of all the transmitted signals.

The method may also be used to process an optical signal comprising a plurality of signals at substantially separate wavelengths, for example, as in a frequency multiplex transmission system.

Where the optical signal comprises one or more digital optical signals, the frequency of the control signal should be no less than the minimum of the bit rates of the digital optical signals. Any information in the digital signal will then be available from either polarisation state of the processed signal. This is one feature of the invention which is especially useful in optical transmission systems.

According to a further aspect of the present invention an optical device for processing an optical signal by a method of the invention comprises control means for providing a control signal at a predetermined scrambling frequency and means for altering the polarisation state of an input optical signal under control of the control means to provide an output optical signal with substantially orthogonal polarisation states alternating sequentially according to the scrambling frequency.

Conveniently, the altering means includes means for splitting the input optical signal from an input signal path into two intermediate signal paths, polarisation changing means disposed in at least one of the intermediate optical paths to render the polarisation states of the intermediate optical signals orthogonal relative to each other and means for recombining the intermediate optical signals to provide the desired output optical signal.

The means for splitting the optical signal may comprise an optical switch for switching selectable proportions of the input optical signal from the input signal path into the two intermediate optical signal paths, the switched proportions being selected under control of the control means.

Conveniently, the optical switch comprises a voltage controlled coupler (VCC).

In this case, the control means provides the control signal for operating the switch. The proportions of the input signal which are switched into each of the intermediate signal paths is determined by the voltage applied to the VCC. Preferably the control signal comprises a squarewave voltage such that the input signal is 100% switched alternately between each of the intermediate signal paths at the scrambling frequency.

Optical devices according to the invention may be used in transmission systems to scramble the polarisation state of an optical signal for information transmission to ensure that the information is available from either of the alternating orthogonal states of the output signal independent of the other. In a coherent optical transmission system such devices may be used to scramble the local oscillator signal rather than the transmitted information signal itself. Various advantages of these arrangements have already been noted in the discussion of the method of the invention above.

Compared with the ideal conditions for heterodyne detection where local oscillator and received information signal polarisations are identical, signal scrambling introduces a constant 3 dB sensitivity reduction at the receiver. However, the scrambled signal detection is independent of the relative states of polarisation. The 3 dB scrambling loss is a constant and a maximum, regardless of any differences in polarisation. In practical transmission systems where the received signal polarisation is generally indeterminate, this represents a considerable advantage over the conventional case where, in the absence of complex and specialised prior art receiver designs, total signal loss may occur.

The minimum desirable scrambling frequency for use in an information transmission system has been defined above in relation to the information carried on the relevant signal. It will be appreciated that the maximum desirable scrambling frequency may be constrained by other system parameters. For example, for noise filtering considerations, for digital signals it is generally preferable to limit the intermediate frequency (IF) bandwidth in non-synchronous IF detectors to within a factor of ten times the signal bit-rate. In such instances, the scrambling frequency is preferably likewise restricted to be no more than ten times the bit rate. Similar limiting factors appropriate to alternative receiver designs will be apparent to those skilled in the art.

As an alternative to step-switching the input signal it is possible to sweep the signal smoothly between the intermediate signal paths. For example, the scrambling signal may comprise a sinusoidal voltage. In these circumstances, however, it is preferable that phase modulating means are disposed in at least one of the intermediate signal paths for adjusting the relative phase of the intermediate optical signals. Preferably, the phase modulating means is controlled by the control means to impose alternating phase shifts on the intermediate signal in one path, such that the vector sum of the polarisation states of the intermediate optical signals alternates to provide the alternating, orthogonal polarisation states of the output signal. Conveniently, the phase modulating means imposes a 180° phase shift onto the signal in one of the intermediate signal paths for the duration of every second half cycle of the scrambling sinusoid. As is explained in the detailed description below, the introduction of this phase shift means that the polarisation state of the combined output signal alternates as desired and the detected signal amplitude at a receiver is rendered independent of the signal polarisation. As for the step-switched case above, again there is a constant and maximum loss in sensitivity of 3 dB regardless of the relative states of polarisation of the received and local oscillator signals.

Preferably, the polarisation changing means is adapted to introduce a fixed rotation of 90° in the polarisation of a signal in one of the intermediate optical paths relative to the polarisation of the signal in the other path. This is the most straightforward way to achieve the orthogonal polarisations required. It is not necessary to use complicated tunable bulk optical polarisation rotators, such as the aforementioned Faraday rotators, for example.

Conveniently, the polarisation changing means comprises a TE-TM converter, which may be implemented as a planar integrated optical device. The polarisation changing means may further comprise an integrated optical phase shifter in association with the TE-TM converter. The phase shifter may be used to adjust the phase difference between TM and TE modes of the input signal in the first intermediate optical path to 90° so that the TE-TM converter may operate for all incoming states of polarisation. If the polarisation of the input signal is predetermined and fixed then the phase shifter is not needed.

Conveniently, therefore, the input signal path will comprise a polarisation holding optical fibre to enable the state of polarisation of the input signal to the optical device to be fixed. Where the device components are integrated on a lithium niobate substrate, for example, the input polarisation will preferably be fixed in TE mode.

As an alternative to using an integrated TE-TM converter, the polarisation rotation may also be simply effected using a suitable birefringent medium such as, for example, an appropriate length of birefringent optical fibre. The fibre might then perform the functions of an intermediate optical path and polarisation changing means together. Other variations will be apparent to those skilled in the art.

The input signal will normally come from a semiconductor laser. The input signal may be provided via an optical modulator, for example, a planar waveguide c device formed on a substrate with the optical device.

The recombining means is conveniently a 1:1 directional coupler. Most preferably the coupler is a polarisation selective device arranged to cross couple only one of the two orthogonal polarisations to maximise the output signal power. Using a polarisation selective coupler the 3 dB reduction in transmissible power which is otherwise introduced by an ordinary coupler is avoided.

In order to balance the contributions to the output signal amplitude from each of the intermediate signal paths it may be desirable to introduce an optical attenuator into one or both of these paths.

In a further aspect of the present invention an optical device is provided which can both process an optical signal by the method of the invention and additionally alter the polarisation state of an input signal from any given state to any other desired state.

According to this further aspect of the invention an optical device comprises means for splitting selectable proportions of an input optical signal from an input signal path into two intermediate optical signal paths, polarisation changing means disposed in at least one of the intermediate optical signal paths and arranged to render the polarisation states of the intermediate optical signals substantially mutually orthogonal, controllable phase modulating means in at least one of the intermediate optical paths, control means for controlling the splitting means to select the split proportions and for controlling the phase modulating means to control the phase relationship between the split signals, and means for recombining the two intermediate optical signals for providing a combined output signal of any desired polarisation under control of the first and second control means.

As an alternative to employing such an optical device to scramble an optical signal in a transmission system according to the method of the invention as described above, the device can be used as a simplified polarisation controller, for example, for use in polarisation tracking receivers.

It will be observed that by appropriately controlling the relative proportions of two orthogonally polarised signals and by controlling the phase of these signals relative to each other a device according to this further aspect of the invention can construct a combined output signal with any desired polarisation. Thus, to process an optical signal by a method of the invention, the intermediate optical signal phase relationship is controlled to alternate as required. Alternatively, for use as a polarisation controller, the device may be inserted in the local oscillator path of a coherent receiver, for example, to provide a continuous (as opposed to an alternating) adjustment of signal polarisation to enable the local oscillator polarisation to track an incoming signal polarisation as is required in a polarisation tracking receiver. It is a particular advantage of this more generally applicable device that all the major optical components, for example, splitting means (switch), phase modulator(s), polarisation changing means and recombining means (output coupler) may be fabricated as integrated optical devices and on a common substrate if desired. It will be appreciated that preferred device features defined with respect to the previously described embodiments of devices according to the invention are applicable, where appropriate, to embodiments of the device according to the invention in this further aspect mutatis mutandis. For example, the splitting means may conveniently comprise an optical switch such as a voltage controlled coupler (VCC).

BRIEF DESCRIPTION OF THE DRAWINGS

Various aspects of the invention will now be described in detail, by way of example only, with reference to the accompanying Figures, in which.

DETAILED DESCRIPTION OF EXEMPLARY EMBODIMENTS

Figure 1:
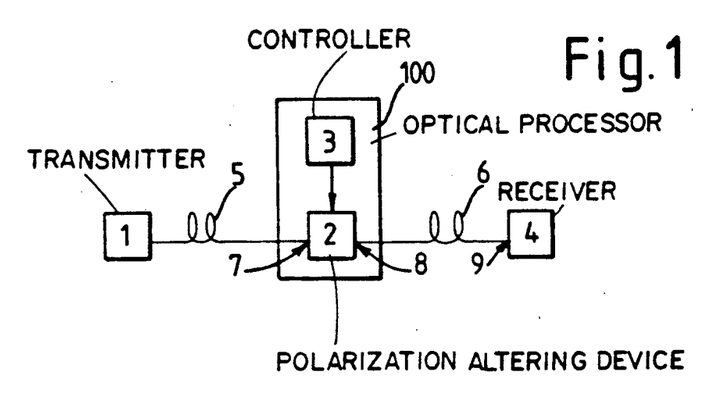
FIG. 1 is a schematic diagram of an optical transmission system using a method of processing an optical signals according to the present invention.

The transmission system illustrated in FIG. 1 comprises a transmitter 1 connected to transmit a signal via optical waveguides 5,6 to a receiver 4. An optical device 100 for processing the signal is positioned in the optical path between the transmitter 1 and receiver 4. The processing device 100 itself comprises a polarisation altering device 2 and a controller 3. In this case the altering device 2 comprises a voltage or current controllable birefringent material. (Electro-optic materials exhibiting Kerr and/or Pockel effects; magneto-optic materials for Faraday rotation; or materials with stress-dependent birefringence are examples known in the art.)

The altering device 2 is arranged to receive an input signal from the transmitter via the waveguide 5 and to output a processed (or "scrambled") signal via the waveguide 6 to the receiver 4. The signal at the input 7 of the altering device 2 is arranged to have a linear, substantially constant, polarisation state. In practice, the polarisation of a signal from the transmitter 1 may drift slowly over a long period (e.g. days), but this is not particularly relevant when compared to the (very) high frequencies at which optical transmission systems operate. However, the input polarisation state may be assured using conventional means, if required. For example, the waveguide 5 may be made of polarisation holding optical fibre. The altering device 2 is aligned with its birefringent material axes at 45° to the axis of polarisation of the input signal.

The operation of the polarisation altering device 2 is controlled by the controller 3. A control signal, the "scrambling" signal, from the controller 3 is applied to the birefringent material in the altering device 2 so that the birefringence is altered along one axis only. The amplitude of the scrambling signal is set to produce a birefringence change sufficient to cause an alternating 180° phase shift in a signal component along that axis. The polarisation of the processed signal at the output 8 of the altering device 2 then alternates between two orthogonal, linear states according to the frequency of the scrambling signal.

Whatever the birefringence of the second connecting waveguide 6, as will be explained in more detail below, it can be shown that the signal which arrives at the input 9 of the receiver 4 will then also have alternating othogonal polarisation states (although those states may not necessarily be linear). Therefore, even if one of those orthogonal polarisation states is completely mismatched to the receiver 4, the complementary, orthogonal polarisation will nevertheless be passed and the processed signal will be detected.

Figure 2:
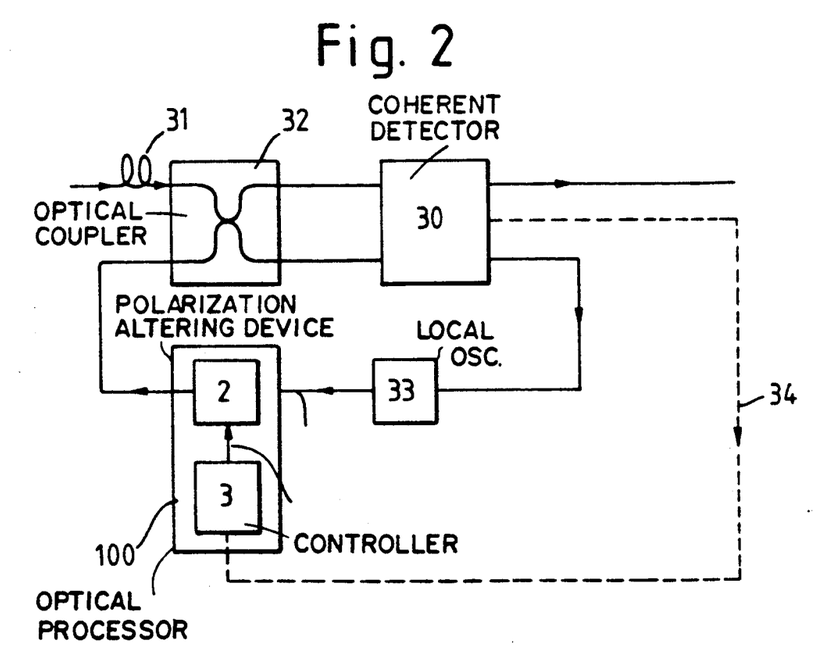
FIG. 2 is a schematic diagram of a coherent optical receiver using the method to process a local oscillator signal.

In FIG. 1 the polarisation scrambling is performed directly on the transmitted signal. In coherent optical transmission systems it is possible, as an alternative, to scramble the local oscillator signal to achieve similar advantages. FIG. 2 shows a schematic diagram of a coherent optical receiver illustrating how the scrambling may be carried out. The receiver comprises a balanced coherent detector 30 which receives an input transmitted information signal (arriving on an input fibre 31) after mixing with a local oscillator signal in an input optical coupler 32. In this case, the processing device 100 comprising the polarisation altering device 2 and controller 3, as used in the embodiment of FIG. 1, is arranged to process (scramble) the signal from the local oscillator source 33 to provide a scrambled local oscillator signal with alternating orthogonal polarisations to the mixing coupler 32. For convenience, the detected signal output and the local oscillator frequency control provided by the detector 30 are also indicated in FIG. 2.

To ensure that the input information signal is fully detectable even if one of the orthogonal local oscillator polarisations is completely mismatched to the information signal polarisation it is necessary to ensure that the scrambling is carried out at a sufficiently high frequency (for example, at least as high as the bit rate of a digital optical information signal). If the information rate changes, it may then be desirable to correspondingly alter the control signal scrambling frequency. The controller 3 of FIG. 2 may be provided with the option to make such adjustment in response to an appropriate feedback 34 from the detector 30. (If desired, a similar provision could also be made in the arrangement of FIG. 1 to enable the controller 3 to respond appropriately to changes in the information rate of the signal from the transmitter 4.)

The basic processing device 100 described in relation to FIGS. 1 and 2 may be provided in other forms. Alternative optical devices for carrying out the processing will be described below. Various aspects of the present invention will also be treated in more detail with particular reference to these alternative devices.

Figure 3:
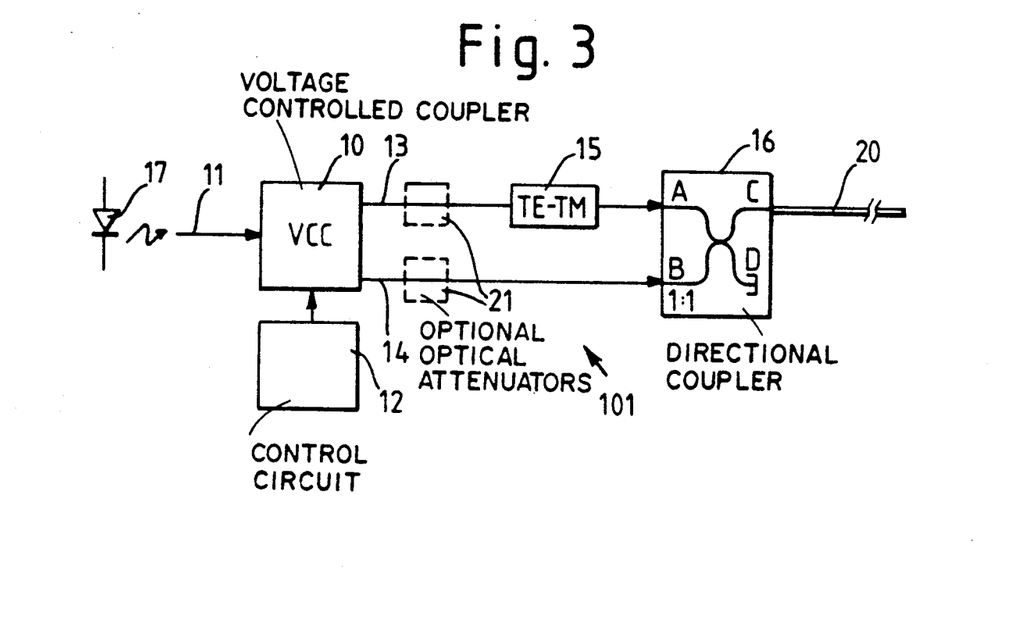
FIGS. 3 and 4 are schematic diagrams of embodiments of an optical device according to the present invention.

Referring now to FIG. 3, an optical device 101 for polarisation scrambling comprises a voltage controlled coupler (VCC) 10 configured to switch a signal from an input optical fibre 11 alternately between two intermediate optical paths 13, 14. The signal polarisation in one of these paths 13 is rendered orthogonal to the signal polarisation in the other path 14 by a TE-TM converter 15 and the signals are then recombined via a 1:1 directional coupler 16. The combined signal is then output at C into an optical fibre 20.

The switching of the VCC 10 is controlled by a squarewave scrambling signal of frequency f generated by a control circuit 12. The VCC 10 is a planar electro-optic waveguide device which preferentially transmits signals of a given polarisation, in this case TE mode, only. The signal may be completely switched between the intermediate paths 13, 14 under control of the appropriate drive from the control circuit 12.

To achieve stability of the switched signals, since the VCC 10 is polarisation sensitive, the polarisation of the input signal is constrained (in TE orientation) by a length of polarisation-holding optical fibre 11 between the signal source, here a semiconductor laser 17, and the input of the VCC 10.

In operation, a signal from the laser 17 is alternately switched, at the scrambling frequency, between the two intermediate signal paths 13, 14 from the VCC 10. As the polarisation of the input signal is held matched to the selectivity of the VCC 10 by the polarisation-holding fibre 11, the split signals leaving the VCC are in the same polarisation. The signal polarisation in one path 13 alone is rendered orthogonal by the TE-TM converter 15 which is also a planar integrated optical device. The signal loss in the TE-TM converter can generally be considered negligible. However, if necessary, the signals in the two intermediate optical paths can be balanced using an optical attenuator 21 optionally in one or both paths as shown.

After passage through the TE-TM converter the signals in the two paths are thus orthogonally polarised relative to each other. These orthogonally polarised signals are then combined by a 1:1 directional coupler 16 into a combined output signal. The combined signal is shown as passing from one output C of the directional coupler 16 into an output fibre 20. The second output port D of the coupler 16 is shown terminated in a non-reflective manner. However, it will be apparent that with a conventional 1:1 coupler 16 the combined signal is potentially available for onward transmission from each output port C,D. Consequently, if the total transmissible power available at the two output ports is directed to a single output a 3 dB increase in transmissible signal power is achievable. Use of a polarisation selective coupler to selectively cross couple only one of the orthogonal polarisations (in this case the TE mode), permits this gain.

The output signal at C comprises a reconstruction of the original input signal, but with alternating orthogonal shifts of polarisation at the scrambling frequency, f. If the signal is digital, the scrambling frequency should be at least equal to the digital bit rate. With the embodiment of FIG. 3, in order to make the received signal detection independent of the signal polarisation, as is further explained below, the scrambling frequency is preferably squarewave.

Figure 4:
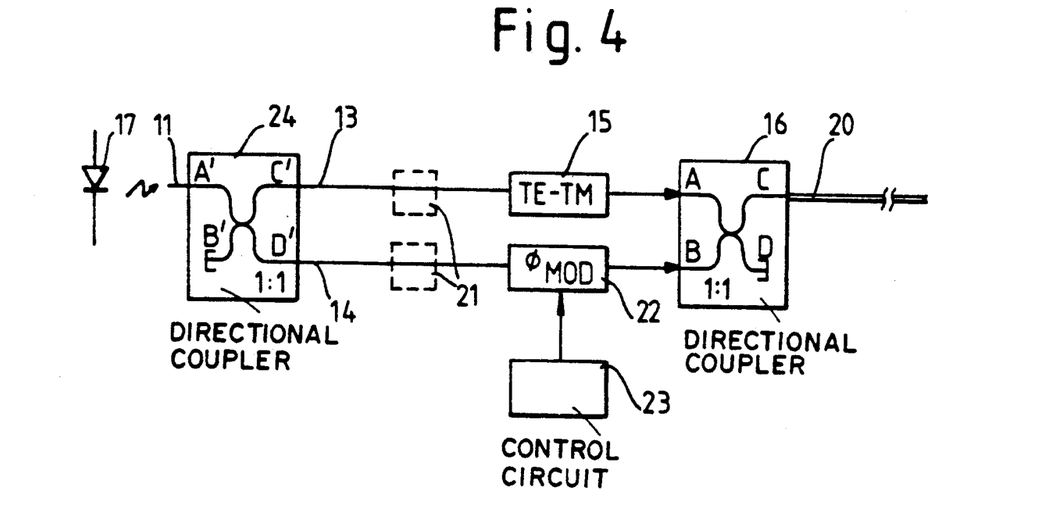

Referring now to FIG. 4, an alternative embodiment of the present invention will now be described. This embodiment arises from the inventor's appreciation that a phase modulator can be used in place of the VCC to implement the signal polarisation scrambling. In this embodiment, the VCC is eliminated and is replaced by a passive 1:1 directional coupler 24. One input A' of this coupler 24 receives the input signal from the laser 17. The other input port B' is suitably provided with a non-reflective termination. The input signal is continuously split in substantially equal proportions into the two intermediate signal paths 13,14 via the output ports C',D' of the coupler 24. A phase modulator 22 is inserted into one of these paths 13,14. The phase modulator 22 is shown inserted in the path 14 separate from the path 13 which contains the TE-TM converter 15, but both these devices could equally well be inserted in the same path.

The scrambling is effected by switching the phase modulator 22 under control of a control circuit 23 to introduce alternate 180° phase shifts into the signal in one of the intermediate signal paths at the scrambling frequency. The directional coupler 16 then produces a combined output signal from the two intermediate signals in the same manner as previously described. It will be appreciated that the combined output signal will again comprise a reconstruction of the original input signal with alternating orthogonal shifts of polarisation at the scrambling frequency as for the embodiment of FIG. 3. In this case it is the vector sum of the polarisation states of the intermediate optical signals which alternates on recombination thereby providing the required alternating orthogonal polarisation shifts in the output signal.

Generally, when a signal is transmitted through a birefringent medium the polarisation of that signal will be altered. However, if the transmitted signal comprises components with mutually orthogonal polarisations, those component polarisations, whilst they are individually altered during transmission, remain mutually orthogonal, as the present inventor has recognised to advantage.

Figure 5:
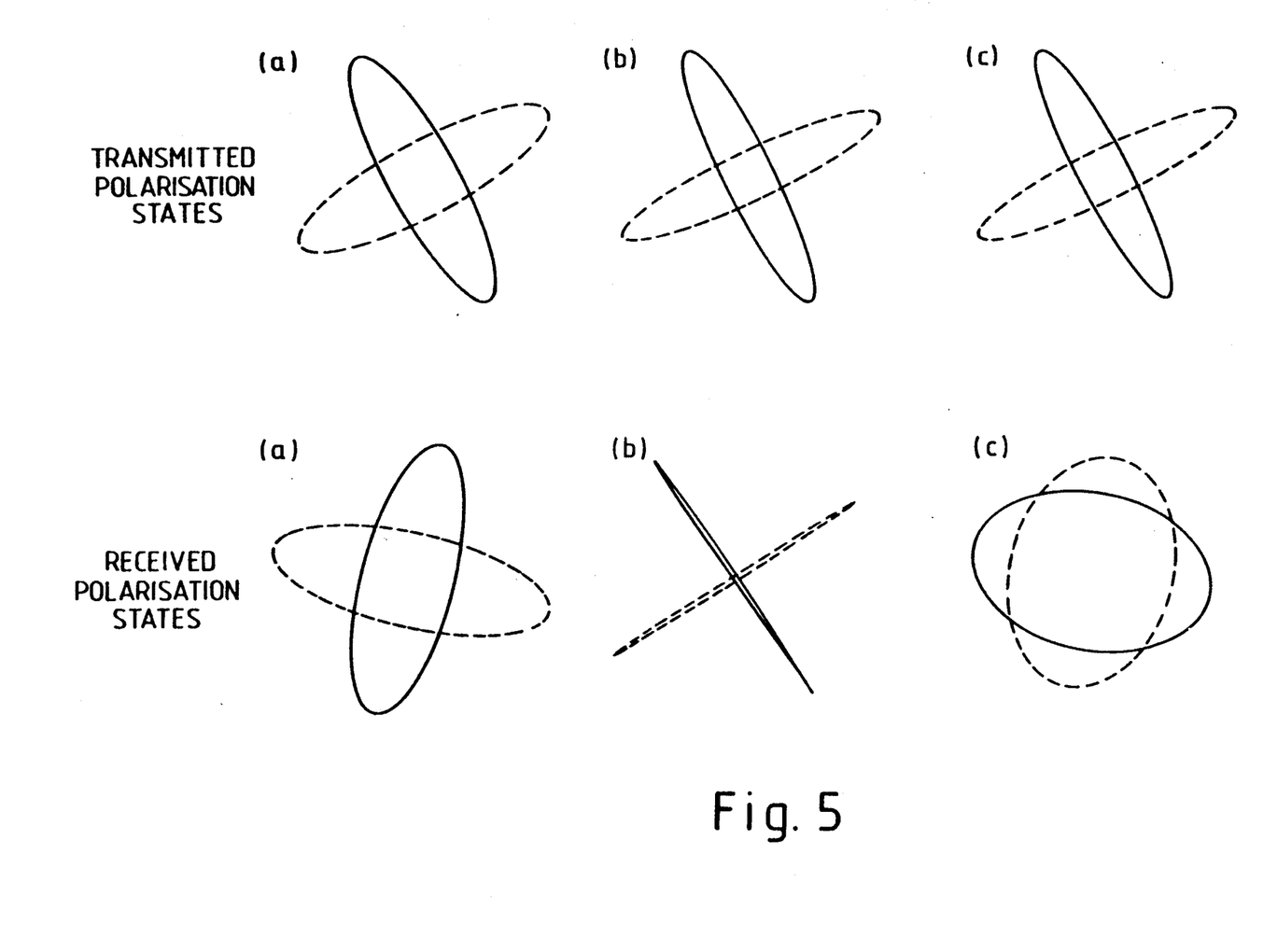
FIGS. 5 to 8 show the results of simulations of processing a variety of signals according to the method of the present invention.

This property is demonstrated in FIG. 5 which illustrates the results of transmitting a signal with orthogonally polarised components through a transmission path comprising a series of birefringent sections of transmission medium each with randomly oriented birefringent axes and random birefringent delay. The results relate to transmission through (a) 30 such sections, (b) 50 such sections and (c) 100 such sections. The upper plot in each case shows the transmitted polarisation states and the lower the received polarisation states, which differ from the transmitted states but which remain orthogonal. The solid traces represent clockwise rotations and the dashed traces anticlockwise rotations of polarisation.

A signal with components of mutually orthogonal polarisations as produced by an optical device according to the present invention may be detected using a conventional coherent receiver. In this case the local oscillator signal in such a receiver will have a single polarisation and there will be no switching of the local oscillator signal between orthogonally polarised states. Consequently, the polarisation of the local oscillator signal itself can never be orthogonal to both components of the received, scrambled signal. Therefore, the possibility of total fading loss of the detected signal, which can occur in conventional systems when the local oscillator signal polarisation is orthogonal to a received signal of single component polarisation, is avoided.

To explain the form of signal which is derived in coherent detection of a scrambled signal it is helpful to consider a simplified mathematical analysis. The following analysis considers heterodyne coherent detection by way of example. The transmitted optical field may be expressed generally as:

$$e_s = E_s \cos(\omega_s t) \qquad (1)$$

and the optical power in this field as:

$$P_s = E_s^2/2 \qquad (2)$$

In the general case, to take account of arbitrary polarisations, it is convenient to resolve $e_s$ into orthogonal field components $e_{sx}$ and $e_{sy}$ with associated phase shifts $\phi_{sx}$, $\phi_{sy}$:

$$e_{sx} = E_s[K_{sx}]^{0.5} \cos(\omega_s t + \phi_{sx}) \qquad (3)$$

$$e_{sy} = E_s[K_{sy}]^{0.5} \cos(\omega_s t + \phi_{sy}) \qquad (4)$$

where $K_{sx}$ and $K_{sy}$ represent the fractions of the total received signal power in each of the respective reference planes, and $K_{sy} = 1 - K_{sx}$, such that:

$$e_{sy} = E_s[1 - K_{sx}]^{0.5} \cos(\omega_s t + \phi_{sy}) \qquad (5)$$

The effects on the signal polarization produced by transmission through a linearly birefrigent medium (having axes of birefrigenece $x'$ and $y'$) can be treated mathematically by a rotation of the reference axes through an angle $\theta$ ($x$ to $x'$, $y$ to $y'$) together with a relative phase shift, $\delta$, of the Y-field with respect to the X-field, such that:

$$e_{sx'} = E_s[K_{sx'}]^{0.5} \cos(\omega_s t + \phi_{sx'}) \qquad (6)$$

$$K_{sx'} = 0.5 + (K_{sx} - 0.5)\cos 2\theta + [K_{sx}K_{sy}]^{0.5}\sin 2\theta\cos(\phi_{sy} - \phi_{sx} + \delta) \qquad (7)$$

$$\phi_{sx'} = \qquad (8)$$

$$\tan^{-1}\left\{\frac{[K_{sx}]^{0.5}\cos\theta\sin\phi_{sx} + [K_{sy}]^{0.5}\sin\theta\sin(\phi_{sy} + \delta)}{[K_{sx}]^{0.5}\cos\theta\cos\phi_{sx} + [K_{sy}]^{0.5}\sin\theta\cos(\phi_{sy} + \delta)}\right\}$$

and: $e_{sy'} = E_s[K_{sy'}]^{0.5}\cos(\omega_s t + \phi_{sy'}) \qquad (9)$ $$K_{sy'} = 0.5 + [0.5 - K_{sx}]\cos 2\theta - [K_{sx}K_{sy}]^{0.5}\sin 2\theta\cos(\phi_{sy} - \phi_{sx} + \delta) \qquad (10)$$

$$\phi_{sy'} = \qquad (11)$$

$$\tan^{-1}\left\{\frac{[K_{sy}]^{0.5}\cos\theta\sin(\phi_{sy} + \delta) - [K_{sx}]^{0.5}\sin\theta\sin\phi_{sx}}{[K_{sy}]^{0.5}\cos\theta\cos(\phi_{sy} + \delta) - [K_{sx}]^{0.5}\sin\theta\cos\phi_{sx}}\right\}$$

These equations can be used iteratively where the signal is transmitted through a series of different linearly birefringent transmission paths. A similar mathematical treatment may be developed for the general case of elliptical birefringence. Alternatively the Poincare sphere representation may be used to illustrate graphically the evolution of the polarisation. (See, for example, Rashleigh, "Origins and Control of Polarisation Effects", Journal of Lightwave Technology, Vol. LT-1, No. 2, June 1983.)

Using the above equations it is further possible to obtain expressions for the intermediate frequency (IF) signal derived when the received signal is subject to heterodyne detection. For comparison purposes it is convenient to normalise the detected signal amplitude relative to the amplitude which would be obtained in the conventionally ideal case where received and local oscillator signal polarisations are perfectly matched. In such circumstances, in a digital system, for example, for a sequence of transmitted '1's the amplitude of the demodulated IF signal can be normalised to unity (i.e. the mean value of the IF envelope can be set to unity). Note that, for ideal amplitude shift keying (ASK), there is no need to consider transmitted '0's because there will be no resultant IF. Taking the local oscillator signal with resolved components $e_{lx}$, $e_{ly}$ each carrying fractions of the local oscillator power $K_{lx}$, $K_{ly}$ respectively, the demodulated IF signal, $v_{IF}$ can be expressed as:

$$v_{IF} = A_p \cos(\omega_{IF} t + \phi_p) \qquad (12)$$

where:

$$A_p = (K_A + K_B)^{0.5} \qquad (13)$$

$$K_A = K_{lx}K_{sx'} + K_{ly}K_{sy'} \qquad (14)$$

$$K_B = [4(K_{lx}K_{sx'})(K_{ly}K_{sy'})]^{0.5}\cos[\phi_{ly} - \phi_{lx} - \phi_{sy'} + \phi_{sx'}] \qquad (15)$$

and:

$$\phi_p = \tan^{-1}\phi(LS) \qquad (16)$$

$$\phi(LS) = \qquad (17)$$

$$\frac{[K_{lx}K_{sx'}]^{0.5}\sin(\phi_{lx} - \phi_{sx'}) + [K_{ly}K_{sy'}]^{0.5}\sin(\phi_{ly} - \phi_{sy'})}{[K_{lx}K_{sx'}]^{0.5}\cos(\phi_{lx} - \phi_{sx'}) + [K_{ly}K_{sy'}]^{0.5}\cos(\phi_{ly} - \phi_{sy'})}$$

These equations are simplifications which are appropriate to one complete cycle of a squarewave scrambled signal or to one particular instant if the scrambling signal is smoothly varying (e.g. sinusoidal). Scrambling of the transmitted signal will introduce a time variance in $K_{sx}, k_{sy}, \phi_{sx}$ and $\phi_{sy}$ dependent on the time variance of scrambling signal itself (e.g. $K_{sx}$ will become $K_{sx}[S(t)]$, where $S(t)$ is the scrambling signal function).

Figure 6:
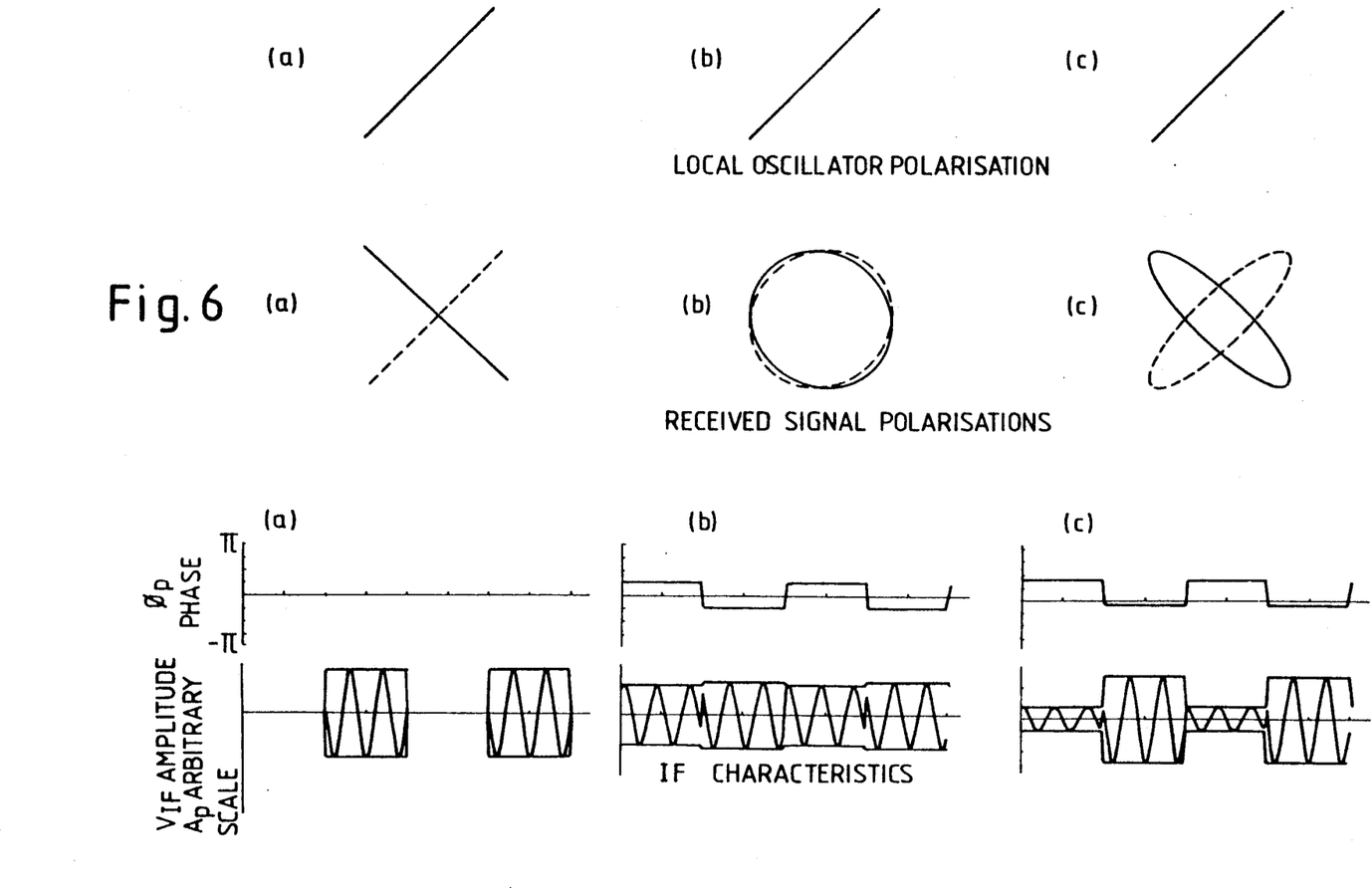
Figure 7:
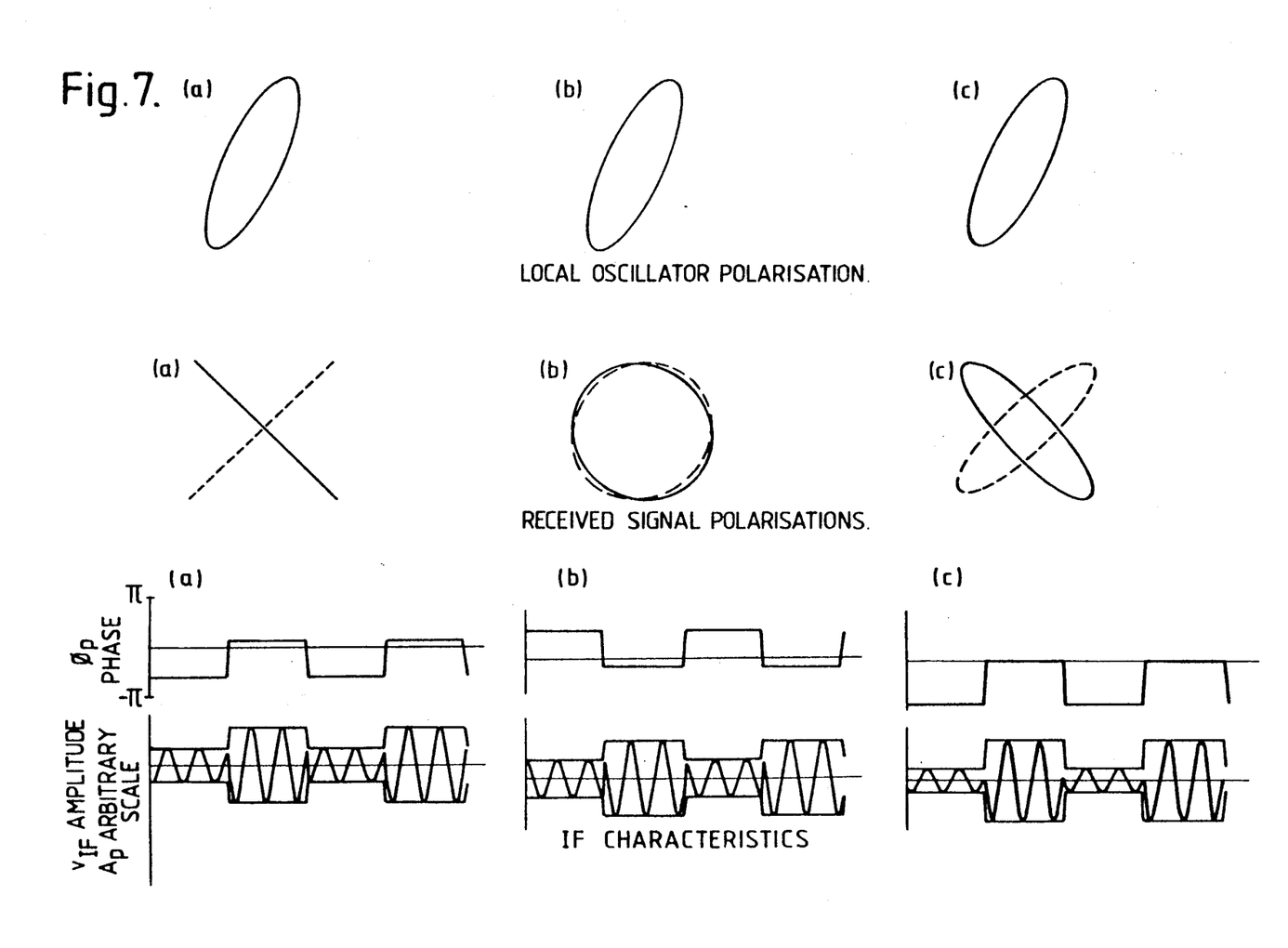

In order to confirm the effects of signal scrambling as predicted by the above calculations, tests have been carried out simulating different combinations of local oscillator and received signal polarisations. Example results are illustrated in FIGS. 6 and 7 for a transmitted digital sequence of '1's scrambled with a squarewave scrambling signal at a frequency equal to the digital bit rate. The upper two sets of plots in each case show the local oscillator polarisation and the relative polarisations of the scrambled, received signal components. The lower two sets of plots illustrate the demodulated IF characteristics of the received signals. The $v_{IF}$ signal is shown with its associated amplitude envelope $A_p$, over a period of two '1' bits of the digital signal in all the examples. The relative phase, $\phi_p$, of the IF signal over the same period is also shown.

FIG. 6 shows the results of tests using a linearly polarised local oscillator signal, whilst FIG. 7 shows results for an elliptically polarised local oscillator signal.

In all the tests it was observed that the mean value of the IF envelope was 0.5. This value is normalised relative to unity for the conventional ideal of perfectly matched local oscillator and received signal as mentioned above. The results confirm that, relative to the ideal, the reduction in received signal power may be maintained at a constant and maximum of 3 dB using squarewave scrambling. In contrast with conventional heterodynne detection, which frequently departs from the ideal, the scrambled signal is never entirely undetected.

Considering FIG. 6(a), for example, in conventional circumstances, in the absence of scrambling, if the received signal had the clockwise polarisation illustrated the signal would be completely missed. However, as the test shows, whilst the scrambled signal is undetected for one half of each bit period, it is unambiguously detected in the remainder with a mean IF amplitude over the whole bit-period at the 0.5 normalised level as expected. For some purposes it may be preferred to sweep the signal smoothly between polarisations, rather than to introduce step changes with a squarewave scrambling signal. It may be desirable to use a sinusoidal scrambling frequency, for example. However, in such circumstances, if the scrambling signal alone is altered, the mean value of the detected IF (at a remote receiver) no longer remains independent of the received signal polarisation. However, this preferable characteristic may be restored by introducing a 180° phase shift into one of the component fields (e.g. $\phi_{sx}$ or $\phi_{sy}$) for the duration of alternate half-cycles of the scrambling signal.

Figure 8:
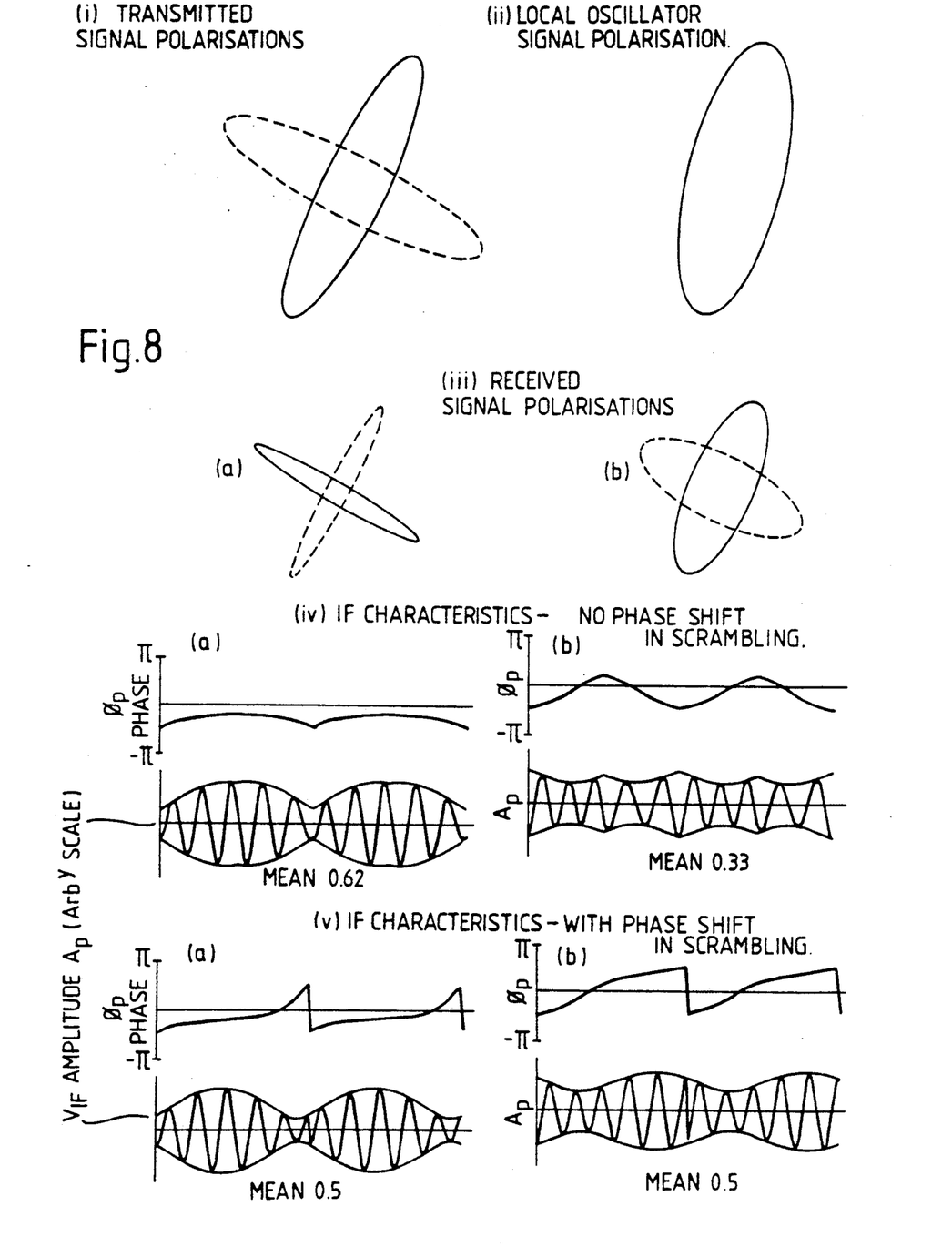

FIG. 8 illustrates the results of tests using a sinusoidal scrambling signal, with and without the relevant phase shift. For these tests the transmitted signal with polarisation states (i) was detected using an elliptically polarised local oscillator signal (ii). The results show, for transmission over two different transmission lines (a) and (b), the received signal polarisations (iii), the IF characteristics in the absence of the phase shift (iv) and the IF characteristics with the phase shift (v). When no phase shift is introduced into the scrambled signal, the mean IF level was 0.62 for transmission line (a) and 0.33 for transmission line (b). These results show that, in the absence of the phase shift, the amplitude of the detected signals is polarisation (i.e. transmission line) dependent. In contrast, however, when the appropriate 180° phase shift is introduced, as shown at (v), the mean IF level is 0.5 in both cases and the scrambled signal detection is again independent of the received polarisations as for the step-switched, squarewave case described above.

Figure 9:
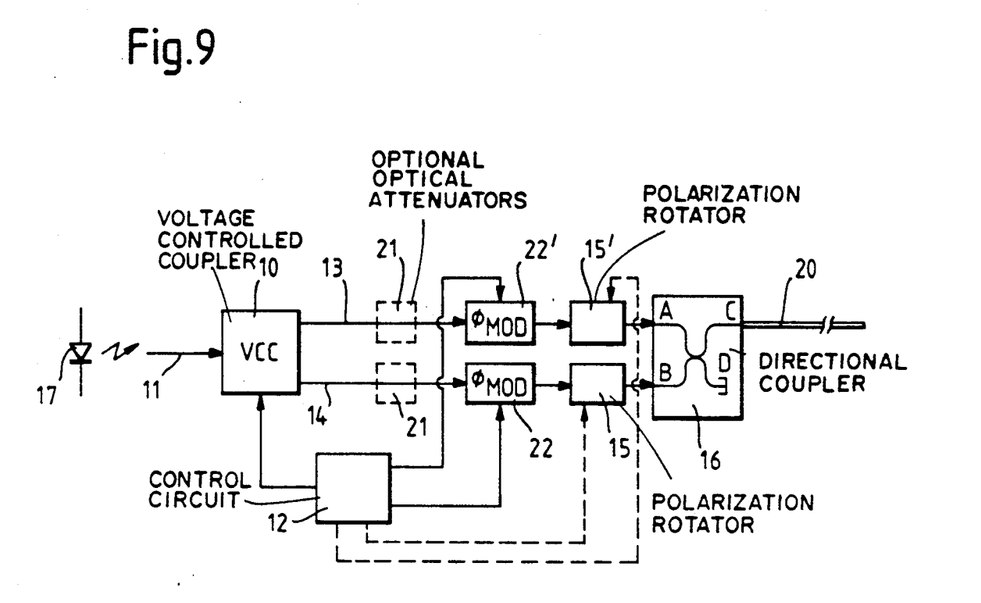
FIGS. 9 and 10 are schematic embodiments of optical devices according to the further aspect of the invention which can process signals according to the method and also provide more general polarisation control functions.

To achieve this independence using a smoothly varying scrambling signal, such as a sinusoidal signal, it is convenient to employ an alternative embodiment of a device according to the present invention as illustrated, for example, in FIG. 9.

The device shown in FIG. 9 is a version of the processing devices described with reference to FIG. 3 and FIG. 4 with phase modulators 22,22' in both intermediate optical paths. Equivalent components of the device are therefore labelled with equivalent reference numerals. The device comprises a voltage controlled coupler 10 which splits proportions of an input optical signal from an input path 11 into two intermediate signal paths 13,14. As with the FIG. 3 device, a control circuit 12 controls the VCC 10 to determine the proportions which are split into each path 13,14. Each intermediate signal path 13,14 includes a phase modulator 22,22' in series with a polarisation rotator 15,15'. The phase modulators 22,22' are also controlled by the control circuit 12. If desired, the polarisation rotators 15,15' may also be subject to control by the control circuit 12. The output directional coupler 16 is again provided to recombine the signals from the intermediate signal paths into a combined output signal.

This device combines the features of the FIG. 3 and FIG. 4 devices so that it is possible to scramble an input optical signal to produce an output signal with alternating orthogonal polarisation states in either of the ways described with respect to those devices.

Thus, as one option, the controller 12 supplies the scrambling signal to the VCC whilst the polarisation rotator(s) 15,15' are set to render the polarisation states of the intermediate optical signals mutually orthogonal (cf FIG. 3 and related description). In this case it may not be necessary to introduce any relative phase shift, so phase modulators 22,22' need not be driven. In an alternative option, the controller can set the VCC 10 to act as a 1:1 directional coupler and can supply the scrambling signal to drive the phase modulators 22,22' to introduce alternating 180° relative phase shifts (cf FIG. 4 and related description). The polarisation rotators 15,15' are set as for the first option.

It is possible to simplify the optical device of FIG. 9 whilst still allowing the dual control of signal split (using VCC 10) and relative phase (using phase modulator 22). A simplified device is shown schematically in FIG. 10, for example. In this embodiment, which is otherwise similar to the embodiment of FIG. 9, a single phase modulator 22 is inserted in one of the two intermediate optical paths 13,14. The phase modulator 22 is a voltage controlled planar electro-optic waveguide device which can be fabricated on the same substrate as the VCC 10. Both the VCC 10 and the phase modulator are controlled by the control circuit 12. A TE-TM converter 15 provides a fixed 90° polarisation rotation in one intermediate signal path only.

Figure 10:
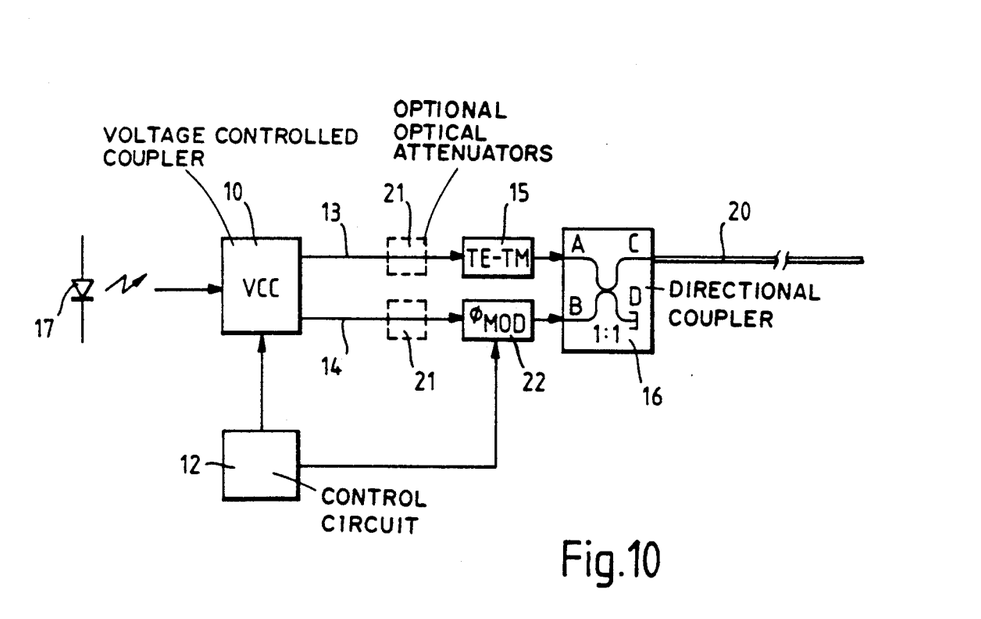

It will be appreciated that this device also can scramble an optical signal in a number of the various ways described earlier. For example, if the scrambling signal is a smoothly varying signal the VCC, under control of the control circuit 12, likewise smoothly changes the proportions of the input signal which are delivered to each of the intermediate signal paths 13,14. In these conditions, the switching of the VCC 10 is a continuous and smooth process in contrast with the alternating step-switching which occurs with a squarewave scrambling signal. The phase modulator 22, however, then introduces step changes in phase of 180° during alternate half cycles of the scrambling signal. The operation of the phase modulator 22 is synchronised with the switching by the scrambling signal and is also controlled by the control circuit 12.

The various foregoing examples and device descriptions demonstrate that using polarisation scrambling, a constant and maximum 3 dB signal reduction, relative to the ideal, is incurred in coherent detection. In the case where signal polarisation is orthogonal to local oscillator polarisation, a conventional receiver experiences complete signal fade. Polarisation scrambling clearly avoids this problem (see e.g. FIG. 6(a)). So long as the 3 dB reduction is within the receiver tolerance, no polarisation control would be required for the local oscillator.

Figure 11:
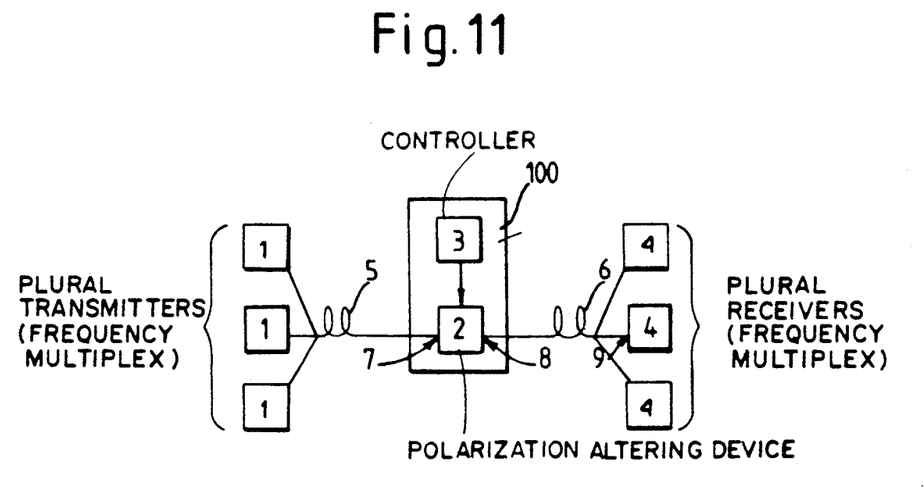
FIG. 11 depicts an alternative embodiment for use in a frequency multiplex environment.

A further advantage of the polarisation scrambling technique is that signals of sufficiently differing wavelengths, for example, in a frequency multiplex system, may be scrambled simultaneously. In a multiplex system as depicted in FIG. 11 it would only be necessary to have one scrambling unit per output transmission fibre serving several distinct transmitters. This represents a considerable potential advantage in equipment cost saving.

Practical devices for implementing polarisation scrambling have been described. However, the use of these devices is not necessarily restricted to such purposes. In particular, the devices of FIGS. 9 and 10 offer greater flexibility of use. As an example, these devices may also be employed as improved polarisation controllers for use in polarisation tracking receivers. For example, as noted earlier, they can conveniently be implemented as integrated optical devices and do not need bulk optical components. For this purpose, as the inventor has recognised, control of the signal proportions using the VCC 10 and of signal phase using the phase modulator(s) 22 together, in combination with at least one polarisation rotator, can allow a combined output signal to be constructed with any desired polarisation whatever. All that is required is for the control circuit 12 to control the VCC 10 to fix the relative proportions of the orthogonal signals and to control the phase modulator 22 to fix the relative phase shift between these signals such that the combination of these signals produces a single combined output signal with the desired polarisation. In this case the control signal(s) would normally be arranged to vary smoothly and slowly in contrast to the rapidly alternating signals used for scrambling.

In a polarisation tracking receiver, the local oscillator would provide the most appropriate signal source. The control circuit 12 would also conveniently comprise a feedback control circuit, for example a self-acquiring control loop, to maintain the combined output signal polarisation matched to the received signal polarisation.

We claim:

1. A method of processing an optical signal used for information transmission comprising:
   providing a polarised optical signal carrying optical information; and
   altering the polarisation state of the polarized optical signal in sequential time intervals in response to a control signal to provide a processed optical signal with substantially orthogonal polarisation states alternating sequentially according to the frequency of said control signal,
   said control signal being at a sufficiently high frequency such that said information carried on the optical signal is detectable from at least one of the alternating orthogonal polarisation states.

2. A method according to claim 1 in which said altering step includes:
   splitting the optical signal into two intermediate polarized optical signals,
   altering the polarisation states of the intermediate polarised optical signals relative to each other in response to said control signal, and
   recombining the intermediate polarised optical signals to produce the processed optical signal.

3. A method according to claim 2 including the step of controlling the relative proportions of the optical signal which is split into the intermediate optical signals by switching of the polarised optical signal between different optical signal paths under control of the control signal.

4. A method according to claim 3 including the steps of:
   rendering the polarisation states of the switched intermediate optical signals mutually orthogonal, and
   recombining the intermediate optical signals such that the processed signal is formed from a time-sequential recombination of the alternating polarisation state, intermediate optical signals.

5. A method according to claim 4 in which the control signal comprises a squarewave signal, and the optical signal is step-switched alternately between different optical signal paths to provide each of the intermediate optical signals.

6. A method according to claim 2 including the steps of:
   rendering the polarisation states of the intermediate optical signals mutually orthogonal, and
   phase modulating at least one of the intermediate optical signals under control of the control signal such that on recombining the intermediate optical signals the vector sum of the polarisation states of the intermediate optical signals alternates in timed sequence to provide the alternating time sequence of orthogonal polarisation states of the processed optical signal.

7. A method according to claim 6 including the step of modulating the phase of one of the intermediate optical signals to impose step phase shifts of substantially 180° during alternative half-cycles of the control signal.

8. A method according to any of claims 1, 3, or 6 including the step of providing as the optical signal to be processed a plurality of signals at substantially separate wavelengths.

9. A method according to any of claims 1, 3, or 6 wherein the step of providing the optical signal comprises providing one or more digital optical signals and wherein the frequency of the control signal is not less than the minimum of the bit rates of the digital optical signals.

10. The method according to claim 1,
    wherein said optical signal includes a digital optical signal having an associated digital bit rate; and
    wherein said control signal frequency is at least equal to said digital bit rate.

11. A method of processing a polarised local oscillator optical signal of a coherent optical detector used for reception of an optical signal carrying optical information comprising:
    altering the polarisation state of the polarised local oscillator signal in sequential time intervals in response to a control signal to provide a processed local oscillator signal with substantially orthogonal polarisation states alternating sequentially according to the frequency of said control signal, said control signal being at a sufficiently high frequency such that the information on the information signal is detectable using at least one of the alternating orthogonal states of the processed local oscillator signal.

12. The method according to claim 11,
wherein the information signal includes a digital information signal having an associated digital bit rate; and
wherein the control signal frequency is at least the bit rate of said digital information signal.

13. A method according to claim 11 in which said altering step includes:
splitting the local oscillator optical signal into two intermediate polarised local oscillator optical signals,
altering the polarisation states of the intermediate polarised local oscillator optical signals relative to each other in response to said control signal, and
recombining the intermediate polarised local oscillator optical signals to produce the processed local oscillator optical signal.

14. A method according to claim 13 including the steps of:
rendering the polarisation states of the intermediate local oscillator optical signals mutually orthogonal, and
phase modulating at least one of the intermediate local oscillator optical signals under control of the control signal such that on recombining the intermediate local oscillator optical signals the vector sum of the polarisation states of the intermediate local oscillator optical signals alternates in timed sequence to provide the alternating time sequence of orthogonal polarisation states of the processed local oscillator optical signal.

15. A method according to claim 14 including the step of modulating the phase of one of the intermediate local oscillator optical signals to impose step phase shifts of substantially 180° during alternative half-cycles of the control signal.

16. A method according to claim 13 including the step of controlling the relative proportions of the local oscillator optical signal which is split into the intermediate optical signals by switching of the polarised local oscillator optical signal between different optical signal paths under control of the control signal.

17. A method according to claim 16 including the steps of:
rendering the polarisation states of the switched intermediate local oscillator optical signals mutually orthogonal, and
recombining the intermediate local oscillator optical signals such that the processed local oscillator signal is formed from a time-sequential recombination of the alternating polarisation state, intermediate local oscillator optical signals.

18. A method according to claim 17 in which the control signal comprises a squarewave signal, and the local oscillator optical signal is step-switched alternately between different optical signal paths to provide each of the intermediate local oscillator optical signals.

19. An optical device for processing an optical signal used for information transmission or reception, said device comprising:
control means for providing a control signal and means for altering the polarisation state of an input optical signal under control of the control means to provide an output optical signal with substantially orthogonal polarisation states alternating sequentially according to the frequency of said control signal;
the control means including means for setting the control signal at a sufficiently high frequency such that the information is independently detectable in either one of the alternating orthogonal states.

20. An optical device according to claim 19 in which the altering means includes means for splitting the input optical signal from an input signal path into two intermediate signal paths, polarisation changing means disposed in at least one of the intermediate optical paths to render the polarisation states of the intermediate optical signals mutually orthogonal in response to said control signal and means for recombining the intermediate optical signals to provide the desired output optical signal.

21. An optical device according to claim 20 wherein the means for splitting the optical signal comprises an optical switch for switching selectable proportions of the input optical signal from the input signal path into the two intermediate optical signal paths, the switched proportions being selected under control of the control means.

22. An optical device according to claim 21 wherein the optical switch comprises a voltage controlled coupler.

23. An optical device according to claim 20 in which the altering means further includes phase modulating means in at least one of the intermediate optical paths for adjusting the relative phase of the intermediate optical signals.

24. An optical device according to claim 23 wherein the phase modulating means in one of the intermediate signal paths is controlled by the control means to impose alternating phase shifts on the intermediate signal in that path, such that the vector sum of the polarisation states of the intermediate optical signals alternates to provide the alternating, orthogonal polarisation states of the output signal.

25. An optical device according to claim 20 wherein the means for splitting the input optical signal comprises a passive 1:1 directional coupler.

26. An optical device according to claim 20 wherein the recombining means comprises a passive 1:1 directional coupler.

27. An optical device according to claim 19 or claim 20 in which the altering means comprises a TE-TM converter connected to pass at least a portion of said input optical signal.

28. An optical device according to any of claims 19, 20, 21 or 23 comprising integrated optical waveguide devices.

29. The device of claim 19, wherein:
said control means includes means for receiving a digital optical signal having an associated digital bit rate as said input optical signal, and said setting means comprises means for setting said control signal frequency to be at least equal to the digital bit rate.

30. An optical device as in claim 19 comprising me for splitting selectable proportions of an input optical signal from an input signal path into two intermediate optical signal paths, polarisation changing means disposed in at least one of the intermediate optical signal paths and arranged to render the polarisation states of the intermediate optical signals substantially mutually orthogonal, controllable phase modulating means in at least one of the intermediate optical paths, control means for controlling the splitting means to select the split proportions and for controlling the phase modulating means to control the phase relationship between the split signals, and means for recombining the two intermediate optical signals for providing a combined output signal of any desired polarisation under control of the first and second control means.

* * * * *